July 1, 1969   G. CIRIACK ET AL   3,453,479
ELECTRODE SYSTEM FOR ELECTRONIC-DISCHARGE TUBES
Filed Jan. 2, 1968
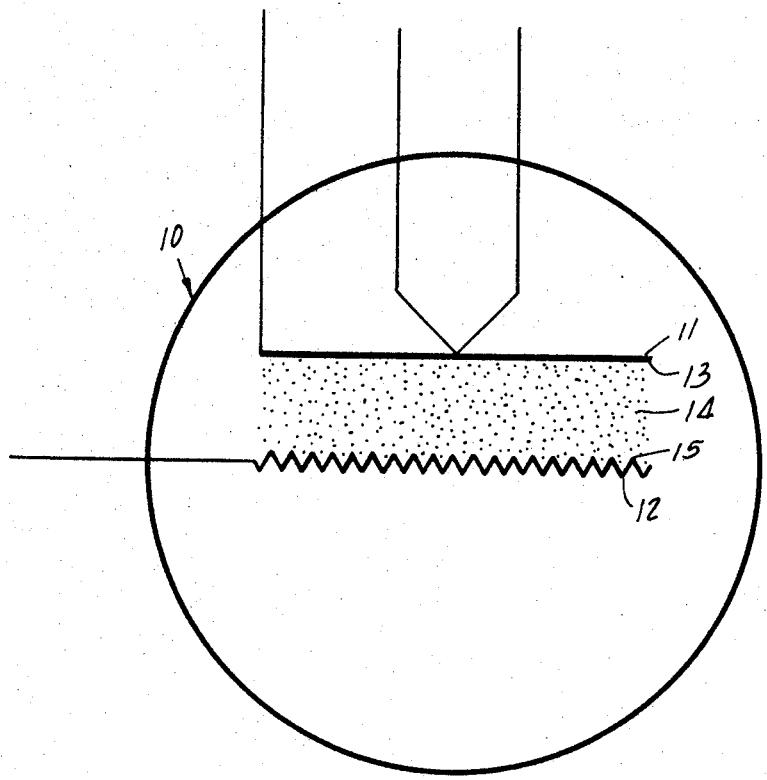
INVENTORS
GÜNTER CIRIACK
GEORG ECKERT
HORST HOFMANN
BY
ATTORNEYS

United States Patent Office 3,453,479
Patented July 1, 1969

---

3,453,479
ELECTRODE SYSTEM FOR ELECTRONIC-DISCHARGE TUBES
Gunter Ciriack, Berlin, and Georg Eckert and Horst Hofmann, Munich, Germany, assignors to Siemens Aktiengesellschaft, a corporation of Germany
Filed Jan. 2, 1968, Ser. No. 694,620
Claims priority, application Germany, Jan. 4, 1967,
S 107,727
Int. Cl. H01j 1/48, 19/30
U.S. Cl. 313—311       2 Claims

ABSTRACT OF THE DISCLOSURE

An electrode system for electronic-discharge tubes, particularly transmitting tubes having a thorium-based cathode and a thermal heavy-duty grid electrode whose grid wire consists of a high-melting metal, such as molybdenum or tantalum having a zirconium coating on the surface containing as a constituent thereof a metal having an affinity to thorium.

BACKGROUND OF THE INVENTION

Field of the invention

An electronic discharge tube having a grid electrode whose grid wire is coated with a zirconium alloy containing as a constituent a metal having a great affinity to thorium.

Description of the prior art

In electronic-discharge tubes having thorium based cathodes and thermal heavy-duty grid electrodes such as transmitting tubes, the grid wires are usually made of a high-melting metal such as molybdenum or tantalum having a coating of zirconium on the surface.

It is known that in such tube electrode systems the thorium in the cathode vaporizes when heated and passes through the tube away from the cathode onto the adjoining grid where it interacts with the zirconium coating and brings about increased thermal emission thereby destroying the effectiveness of the grid and raising the possibility of premature ending of the tube life.

SUMMARY OF THE INVENTION

The present invention overcomes the difficulty of the evaporated thorium from the cathode interfering with the zirconium coated grid by alloying with the zirconium coating a metal having a great affinity to thorium, such as iron, nickel or cobalt.

BRIEF DESCRIPTION OF THE DRAWINGS

FIG. 1 is a schematic diagram of the tube embodying the invention.

DESCRIPTION OF THE PREFERRED EMBODIMENT

According to the present invention an electronic discharge tube such as the usual transmitting tube is shown generally at 10 as having an electrode system composed of a cathode 11 and a grid 12.

The cathode 11 has a base 13 made of thorium which vaporizes when heated and passes away from the cathode as free atoms 14 onto the grid 12.

The grid 12 of the tube is of the thermal heavy-duty type so as not to be affected by the large amount of heat dissipated by such tubes during operation. The wires of the grid 12 are composed of a high-melting metal such as molybdenum, tantalum, or the like and have surface coating 15 of zirconium.

Normally when the thorium vaporizes it interacts with the zirconium coating 15 on the grid lowering its vaporization temperature and thereby increasing the thermal emission of the grid 12 and decreasing the effectiveness and life of the tube.

In the preferred embodiment the zirconium coating 15 of the grid 12 is combined with up to 10% of a metal having a great affinity to thorium such as iron, nickel, or cobalt, as a constituent so that the added metal will interact with the thorium and eliminate the problem of increased thermal emission. Further, it has been found that a 5% concentration by weight of metallic iron in the zirconium metal has proved particularly useful.

This embodiment of our invention has been used for illustrative purposes only and it will be understood that various modifications and variations in the invention may be effected without departing from the spirit and scope thereof.

We claim as our invention:
1. An electrode system for electronic-discharge tubes comprising:
   a cathode having a thorium base and
   a thermal heavy-duty grid electrode having a grid wire composed of a high-melting metal having a zirconium coating containing up to 10% as a constituent a metal having a great affinity to thorium selected from a group consisting of iron, nickel, and cobalt.
2. An electrode system as defined in claim 1 and further characterized by
   said zirconium coating having a metallic iron concentration of 5% by weight as a constituent.

References Cited

UNITED STATES PATENTS

| 2,497,111 | 2/1950  | Williams _____ | 313—107 X |
| 2,794,932 | 6/1957  | Lemaigre-Voreaux _ | 313—179 X |
| 2,821,496 | 1/1958  | Perl _____ | 313—107 X |
| 2,769,114 | 10/1956 | Williams _____ | 313—355 X |
| 3,361,922 | 1/1968  | McCurdy et al. ___ | 313—346 X |
| 3,389,285 | 6/1968  | Thomson _____ | 313—311 X |

JAMES W. LAWRENCE, Primary Examiner.
J. R. SHEWMAKER, Assistant Examiner.

U.S. Cl. X.R.
313—107, 178, 355